United States Patent [19]

Clare et al.

[11] Patent Number: 4,720,389

[45] Date of Patent: Jan. 19, 1988

[54] FOAM-STABILIZED MALT BEVERAGE

[75] Inventors: Kenneth Clare, Vista; Margaret A. Lawson, San Diego, both of Calif.

[73] Assignee: Merck & Co., Inc., Rahway, N.J.

[21] Appl. No.: 855,044

[22] Filed: Apr. 22, 1986

[51] Int. Cl.$^4$ .............................................. C12C 5/02
[52] U.S. Cl. ............................... 426/329; 426/330.4; 426/592
[58] Field of Search ....................... 426/12, 11, 15, 16, 426/28, 29, 32, 61, 64, 321, 329, 330, 330.3, 330.4, 592, 600, 656–658, 654, 422, 423, 569; 435/93; 252/315.3

[56] References Cited

U.S. PATENT DOCUMENTS

| | | | |
|---|---|---|---|
| 2,547,988 | 4/1951 | Wallerstein et al. | 426/329 |
| 3,765,918 | 10/1973 | Jordan et al. | 252/315.3 |
| 3,982,024 | 9/1976 | Oneto | 426/11 |
| 4,298,725 | 11/1981 | Williams et al. | 426/658 |
| 4,575,551 | 3/1986 | Fujiyama et al. | 426/583 |

FOREIGN PATENT DOCUMENTS 0704035  2/1965  Canada ............................ 426/329

*Primary Examiner*—Raymond N. Jones
*Assistant Examiner*—Marianne M. Cintins
*Attorney, Agent, or Firm*—Gabriel Lopez; Hesna J. Pfeiffer

[57] ABSTRACT

A fermented malt beverage having improved foam stability and desirable lace, cling, and clarity is described. The beverage is stabilized by adding 5–400 ppm by weight of combined xanthan gum and a galactomannan, e.g., guar gum or locust bean gum, or the glucomannan konjak gum.

15 Claims, No Drawings

FOAM-STABILIZED MALT BEVERAGE

BACKGROUND OF THE INVENTION

A number of malt beverages or beers will produce a relatively good foam immediately after pouring, but the foams so produced are not as persistent as is usually desired by the consumers of such products. In addition, consumers desire a beer possessing a foam that will "cling" to the insides of a glass or mug in an attractive "lacy" pattern. Lace and cling are difficult to achieve in the presence of slight contaminant levels of surfactants or detergents on the glassware, as occurs when beer mugs or glasses are handwashed and quickly rinsed prior to use. A further requirement is that the beer exhibit good clarity to the consumer, i.e., the absence of any noticeable "haze".

Propylene glycol alginate (PGA), heteropolysaccharide S-10 (see U.S. Pat. No. 3,966,976) and cellulose ether (see U.S. Pat. No. 3 669 000) are additives known to stabilize beer foam.

However, continuing research is being conducted in an effort to discover new polymers, additives, and polymer combinations which may be more economical and which can be utilized to impart improved foam stability, lace, and clarity to fermented malt beverages while avoiding attendant "haze" levels.

Xanthan gum and galactomannans alone or in combination are described in the literature as extenders or thickeners in the food industry. U.S. Pat. No. 3,765,918 describes blends of pre-treated xanthan gum and guar gum which exhibit synergistically high viscosities in aqueous sols. However, there are no general references to such compositions being disclosed for specifically improving foam stability and properties of fermented malt beverages.

SUMMARY OF THE INVENTION

It has now been found that the foam retention and lace/cling properties of a fermented malt beverage can be stabilized while minimizing haze formation by adding a combination of xanthan gum and galactomannan or the glucomannan konjak gum to the beverage in a combined amount sufficient to result in a final concentration in the beverage in the range of about 5–400 ppm, by weight. The galactomannans useful in the invention include, inter alia, guar gum, locust bean gum (lbg), fenugreek, and tara gum, which can be used in a weight ratio of 1:4 to 4:1 of xanthan gum/galactomannan.

DETAILED DESCRIPTION OF THE INVENTION

The term "malt beverage," as used herein, includes such normal foam-forming fermented malt beverages as beer, ale, bock beer, stout, and the like.

By the term "xanthan gum", as used herein, is meant the extracellularly produced gum made by the heteropolysaccharide-producing bacterium *Xanthomonas campestris* by the whole culture fermentation under a variety of conditions of a medium comprising: a fermentable carbohydrate, a nitrogen source, and other appropriate nutrients. Examples, inter alia, of commercially available xanthan gums are KELTROL® T and KELTROL® F, available from Kelco Division of Merck & Co., Inc.

Processes for producing xanthan gum are well-known in the art, e.g., U.S. Pat. Nos. 4,316,012; 4,352,882; 4,375,512; 3,671,398; 3,433,708; 3,271,267; 3,594,280; 3,591,578; 3,391,061; 3,020,206; 3,481,889; 3,391,060; and UK No. 1,448,645.

A preferred form of xanthan gum utilized in the invention is one that has been clarified by any of several known clarification processes. Clarified xanthan gums such as KELTRO® T and K5B143 (Kelco Div., Merck & Co., Inc.) are commercially available.

A clarified xanthan gum is one that has a 1% (wt./vol.) solution (deionized water) transmittance of not less than 85%, measured on a Bausch and Lomb Spectronic Model 21 (600 mm, 25° C., 10 mm cell).

By the term "galactomannan", as used herein, is meant a linear polysaccharide comprised of mannopyranosyl and galactopyranosyl units linked together.

Examples of applicable galactomannans include guar, locust bean, fenugreek, Cassia, and tara gums. Preferred galactomannans are guar gum and locust bean gum.

Guar gum (e.g., Supercol®, Henkel Corp., Minneapolis, Minn.) is a commercially available product which is essentially the milled endosperm of the plant *Cyanaposis tetragonolobus*, family *Leguminosae*. Guar gum is used extensively as an additive in paper manufacturing as an aid in fiber bonding. Guar gum is also used as a flocculating agent in the mining industry since it flocculates clay, carbonates, hydroxides and silica.

Locust bean gum is a high molecular weight polysaccharide derived from *Ceratonia silica*. (See "Industrial Gums": R. L. Whistler (ed.), pp. 323–337, Academic Press, New York (1973)).

Fenugreek gum is a seed extract of *Trigonella foenumgraecum*, family *Leguminosae*. It is an herb of the pea family, the seeds of which are used in curry powder.

Cassia gum is also a seed extract, derived from *Cassia occidentalis* or *fistula*.

Tara gum is a vegetable gum derived from the legume seed, *Cesalpinia spinosa* and is described in "Polysaccharides in Food", Blanshard et al., 232–235, Butterworth & Co., Ltd., 1979.

Konjak (or konjac) gum is a glucomannan extracted from the plant *Amorphophallas konjac*, which reacts in a similar manner with xanthan gum as does guar gum or locust bean gum.

The invention comprises a fermented malt beverage possessing improved foam properties containing xanthan gum and konjak gum or a galactomannan, in a combined amount of about 5–400 ppm by weight of said beverage, preferably 40–100 ppm.

The invention also comprises a process for preparing a fermented malt beverage of improved foam properties which comprises adding to said beverage 5–400 ppm xanthan gum and konjak gum or a galactomannan. Preferably, the two gums are added to raw fermentate prior to standard post-fermentation treatment such as chilling, filtering, and pasteurizing.

The weight ratio of xanthan gum to galactomannan used in the invention is in the range of 1:4 to 4:1 and preferably about 1:1 to 4:1 xanthan gum/galactomannan.

In utilizing xanthan gum and galactomannan in treating a malt beverage in accordance with this invention, it is preferred to use a 0.25 to 1% aqueous solution of a mixture of the two components. The aqueous solution should be thoroughly mixed. This material should be added to the malt beverage after the fermentation step, and preferably, prior to filtering, shortly before the beverage is placed into the commercial container in which it is to be sold.

The process of the instant invention produces the subject composition of the invention which is a fermented malt beverage having acceptable foam properties, including desirable foam retention, lace, cling, and acceptable haze values.

The following examples illustrate suitable methods of carrying out the invention and should not be regarded as being limiting.

EXAMPLE 1

FOAM AND HAZE TESTS

Bulk fermented malt beer samples containing about 3.5% alcohol by volume and 40 ppm by weight of the indicated xanthan gum/galactomannan blend (or zero ppm in the case of the control) after being "chilled" for 24 hours at 40° F. (4.4° C.), were poured into an upright standardized 12 oz. tumbler glass such that the beer was allowed to foam over the side. A stopwatch was started at this point and the elapsed time recorded until the beer foam had deteriorated to the point where liquid appeared through the head. A visual observation of the uniformity of the bubbles in the head and the amount and type of lace and cling was recorded.

The initial "haze" of each sample following the 24 hour "chill" at 4.4° C. was also measured using a Coleman Nephelo-Colorimeter ® according to the general procedure recommended by the manufacturer and the results are also listed below in Table 1-1.

A haze reading of about 15–30 Nephelos units is in the "clear" category and below 15 is termed "brilliant". The values are compared versus a control being the malt beverage excluding the presence of xanthan gum/galactomannan combinations. Values of the control range from about 5 to 20 Nephelos units.

The results of the foam stability and haze tests are given in Table 1-1.

TABLE 1-1

| Sample | Haze | Foam | Lace/Cling |
|---|---|---|---|
| Control | 9–16 | 5–8 min. | very small amount |
| Xanthan[a] | 45–46 | 8½ min. | spotty L/C with larger bubbles than blank |
| Guar[b] | 11–20 | 9¾ min. | coarse foam |
| LBG[c] | 19–22 | 6½ min. | coarse foam no L/C |
| Xan./Guar 2:1 | 19 | 11 min | uniform bubbles good L/C |
| Xan./Lbg 2:1 | 13–15 | 9 min. | coarse creamy top some L/C |

[a]KELTROL ® T
[b]SUPERCOL UH, Henkel Corp.
[c]SUPERCOL 911, Henkel Corp.

EXAMPLE 2

FOAM AND PASTEURIZED HAZE TESTS

Guar gum/xanthan gum combinations were tested, utilizing another foamability test according to the following procedure:

1. Test beer, 350 ml, was poured as a control or containing the designated xanthan gum/galactomannan combination into a 1000 ml vacuum flask, decarbonated under reduced pressure, and brought to room temperature (24° to 25° C.). The gums were added as a 1% aqueous solution calculated to result in a concentration of 100 ppm by weight in the beer. All glassware used in the procedure was rinsed in chromic sulfuric acid cleaning solution, rinsed well with tap water and then deionized water, and dried at 100° C. before using in the foam test.

2. The beer was chilled to 4.4° C. (40° F.) and the initial haze value measured. The beer was pasteurized by heating to 60° C. and holding at this temperature for 2 hours in a water bath. After the beer was again chilled to approximately 4.4° C., the pasteurized haze value was measured.

3. The pasteurized beer of step (2), 25 ml, was transferred into a clean, dry, 50 ml, glass stoppered, graduated cylinder and shaken vigorously for 15 seconds.

4. The treated beer was allowed to stand for 30 seconds. The total volume and liquid levels were read. As a measure of foam stability, the volume of foam (in ml) was calculated as the difference between the total and liquid levels. Additional values were again read after 5, 10, 15, 25, and 40 minutes and foam stability calculated.

The data of Table 2-1 were obtained.

TABLE 2-1

| SAMPLE | Time (min.) | Tot. (ml) | Liq. (ml) | Foam (ml) | Init. Haze | Past. Haze |
|---|---|---|---|---|---|---|
| Xan./Guar 4:1 | 0.5 | 41 | 19 | 22 | | |
| | 5 | 41 | 23.5 | 17.5 | | |
| | 10 | 41 | 24 | 17 | 22 | 21.5 |
| | 15 | 40 | 24 | 16 | | |
| | 25 | 40 | 24 | 16 | | |
| | 40 | 40 | 24 | 16 | | |
| Xan./Guar 4:1 | 0.5 | 42 | 19.5 | 22.5 | | |
| | 5 | 40 | 23.5 | 16.5 | | |
| | 10 | 40 | 24 | 16 | 22 | 21.5 |
| | 15 | 40 | 24 | 16 | | |
| | 25 | 40 | 24 | 16 | | |
| | 40 | 39 | 24 | 15 | | |
| Control | 0.5 | 44 | 18 | 26 | | |
| | 5 | 41 | 23.5 | 17.5 | | |
| | 10 | 36 | 24 | 12 | 10 | 9.0 |
| | 15 | 33 | 24 | 9 | | |
| | 25 | 29 | 24.5 | 4.5 | | |
| | 40 | 26.5 | 25 | 1.5 | | |
| Control | 0.5 | 40 | 21 | 19 | | |
| | 5 | 38 | 24 | 14 | | |
| | 10 | 33 | 24 | 9 | 10 | 9.0 |
| | 15 | 29 | 24.5 | 4.5 | | |
| | 25 | 27.5 | 24.5 | 3 | | |
| | 40 | 26 | 25 | 1 | | |

What is claimed is:

1. A process for improving the foam properties of a fermented malt beverage comprising adding to said beverage xanthan gum in combination with konjak gum or a galactomannan in a combined amount of about 5–400 ppm by weight of said beverage.

2. The process of claim 1 wherein said galactomannan is guar, locust bean, fenugreek, Cassia, or tara gum.

3. The process of claim 2 wherein the galactomannan is guar or locust bean gum.

4. The process of claim 1 wherein said xanthan gum is a clarified xanthan gum.

5. The process of claim 1 wherein said xanthan gum and konjak gum or galactomannan are in a weight ratio in the range of about 4:1 to 1:4.

6. The process of claim 1 wherein said xanthan gum and konjak gum or galactomannan are present in a combined amount of 40–100 ppm by weight based on said beverage.

7. The process of claim 1 wherein said malt beverage exhibits a haze value below 30 Nephelos units.

8. The process of claim 1 comprising:
   1. adding xanthan gum and konjak gum or a galactomannan to raw fermentate;

2. chilling said fermentate to 4.4° C.;
3. pasteurizing the fermentate of step (2) to 60° C. for 2 hours; and then
4. chilling the malt beverage to 4.4° C.

9. A fermented malt beverage possessing improved foam properties containing xanthan gum in combination with konjak gum or a galactomannan in a combined amount of 5–400 ppm by weight of said beverage.

10. The malt beverage of claim 9 wherein said galactomannan is guar, locust bean, fenugreek, Cassia, or tara gum.

11. The malt beverage of claim 9 wherein said xanthan gum is a clarified xanthan gum.

12. The malt beverage of claim 9 wherein said xanthan gum and konjak gum or galactomannan are in a weight ratio of about 4:1 to 4:1.

13. The malt beverage of claim 9 wherein said xanthan gum and konjak gum or galactomannan are present in a combined amount of about 40–100 ppm by weight.

14. The malt beverage of claim 9 exhibiting a haze value of below 30 Nephelos units.

15. A fermented malt beverage of claim 9 possessing improved foam properties containing a clarified xanthan gum/guar gum mixture present in an amount of about 40–100 ppm by weight, and exhibiting a haze value of less than 30 Nephelos units.

* * * * *